United States Patent
Ogasawara et al.

(10) Patent No.: US 8,205,192 B2
(45) Date of Patent: Jun. 19, 2012

(54) COMPILER DEVICE, PROGRAM, AND RECORDING MEDIUM

(75) Inventors: Takeshi Ogasawara, Tokyo (JP); Tamiya Onodera, Saitama-ken (JP); Mikio Takeuchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 12/268,070

(22) Filed: Nov. 10, 2008

(65) Prior Publication Data
US 2009/0187896 A1    Jul. 23, 2009

Related U.S. Application Data

(63) Continuation of application No. 10/787,005, filed on Feb. 25, 2004, now Pat. No. 7,451,437.

(30) Foreign Application Priority Data

Feb. 26, 2003   (JP) .................................. 2003-49414

(51) Int. Cl.
*G06F 9/45* (2006.01)
(52) U.S. Cl. ........................................ 717/151; 717/141
(58) Field of Classification Search ........................ None
See application file for complete search history.

(56) References Cited

U.S. PATENT DOCUMENTS

| | | | |
|---|---|---|---|
| T972003 I4 | 7/1978 | Coleman, Jr. et al. | |
| 4,843,545 A | 6/1989 | Kikuchi | |
| 5,442,790 A | 8/1995 | Nosenchuck | |
| 5,481,708 A | 1/1996 | Kukol | |
| 5,581,696 A | 12/1996 | Kolawa et al. | |
| 6,158,048 A | 12/2000 | Lueh et al. | |
| 6,427,234 B1 * | 7/2002 | Chambers et al. | ............ 717/140 |
| 6,523,168 B1 | 2/2003 | Arnold et al. | |
| 6,701,520 B1 | 3/2004 | Santosuosso et al. | |

(Continued)

FOREIGN PATENT DOCUMENTS

JP    05197565    8/1993

OTHER PUBLICATIONS

Knoop et al., Lazy Code Motion, PLDI, 1992, pp. 224-234.

(Continued)

*Primary Examiner* — Li Zhen
*Assistant Examiner* — Evral Bodden
(74) *Attorney, Agent, or Firm* — Scully, Scott, Murphy & Presser, P.C.; William Stock, Esq.

(57) ABSTRACT

Compiler device for optimizing program which manipulates a character string includes append instruction detection unit, store code generation unit, and append code generation unit. The append instruction detection unit detects an append instruction which appends a character string to a string variable for storing a character string, in the program. The store code generation unit generates, a substitute for each of a plurality of the append instructions detected by the append instruction detection unit, a store code for storing data of an appendant character string to be appended to the string variable by the append instruction into a buffer. The append instructions append the character strings to the same string variable. The append code generation unit generates append code for appending a plurality of the appendant character strings to the string variable, at a position executed before an instruction to refer to the string variable in the program.

5 Claims, 12 Drawing Sheets

U.S. PATENT DOCUMENTS

Figure 1:
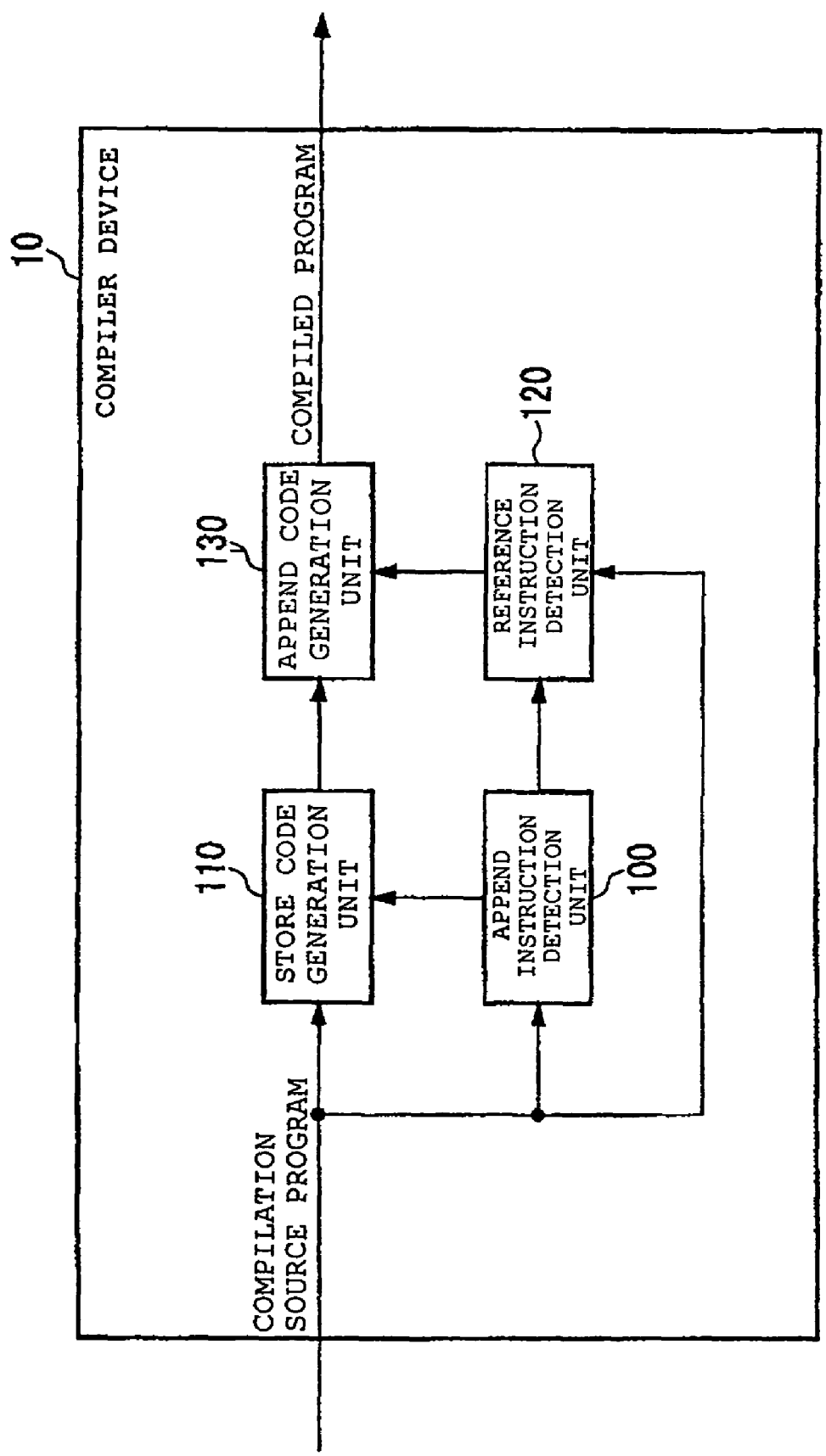

| | | |
|---|---|---|
| 2003/0145312 A1 | 7/2003 | Bates et al. |
| 2004/0019770 A1 | 1/2004 | Kawahito |
| 2004/0128660 A1 | 7/2004 | Nair et al. |
| 2004/0221281 A1 | 11/2004 | Suganuma |
| 2005/0138611 A1 | 6/2005 | Inglis et al. |

OTHER PUBLICATIONS

Knoop et al., Partial Dead Code Elimination, PLDI, 1994, pp. 147-158.

* cited by examiner

FIG.4

1: INITIALIZE buf

2: store c to buf[ ]
3: buf = buf → next

4: store c to buf[ ]
5: buf = buf → next

6: store c to buf[ ]
7: buf = buf → next

8: CONVERT LIST OF buf INTO s.value
9:     = s

FIG.5

(a)
1: sb = s.toStringBuffer()

2: sb.append(c)

3: sb.append(c)

4: sb.append(c)

5: s = sb.toString()
6:    = s (b)
1: s =

2: s = new String(s,c)

3: s = new String(s,c)

4: s = new String(s,c)

5:    = s

COMPILER DEVICE, PROGRAM, AND RECORDING MEDIUM

CROSS-REFERENCE TO RELATED APPLICATIONS

This application is a continuation of U.S. Ser. No. 10/787,005, filed on Feb. 25, 2004, now U.S. Pat. No. 7,451,437 the entire contents of which are incorporated herein by reference.

FIELD OF INVENTION

The present invention relates to a compiler device, a compiler program, and a recording medium and, more particularly, to a compiler device, a compiler program, and a recording medium for optimizing a program which manipulates character strings.

BACKGROUND OF THE INVENTION

In recent years, program languages in which programmers can describe intuitive operators are widely used in order to improve the maintainability and robustness of programs. For example, in the Java (trademark) language, a programmer can easily describe a process of appending a character string to a string variable, using a "+" operator.

Moreover, heretofore, technologies for partial redundancy elimination (refer to non-patent literature 1) and technologies for partial dead assignment elimination (refer to non-patent literature 2) have been used in compilers.

(Non-Patent Literature 1)
J. Knoop, O. Ruthing, and B. Steffen: "Lazy Code Motion," In PLDI '92, 224-234, 1992.

(Non-Patent Literature 2)
J. Knoop, O. Ruthing, and B. Steffen: "Partial Dead Code Elimination," In PLDI '94, 147-158, 1994.

In practice, a process of appending a character string is compiled into a set of many processes, such as reservation of a memory area and copying of data. However, when a plurality of character strings are sequentially appended to the same string variable, redundant reservation of a memory area, redundant copying of data, and the like may occur. Furthermore, these redundant instructions may not be appropriately eliminated by simply adopting technologies for partial redundancy elimination and partial dead assignment elimination. For example, when a process of appending a character string is frequently used in a program for a server, the operation efficiency of the server is lowered.

SUMMARY OF THE INVENTION

Accordingly, an aspect of the present invention is to provide a compiler device, a compiler program, and a recording medium which are capable of solving the above-described problems. This aspect can be achieved by combinations of features described in the appended independent claims. Moreover, the appended dependent claims specify more advantageous concrete examples of the present invention.

Specifically, according to a first aspect of the present invention, a compiler device for optimizing a program which manipulates a character string is provided. The compiler device includes an append instruction detection unit, a store code generation unit, and an append code generation unit. The append instruction detection unit detects an append instruction which appends a character string to a string variable for storing a character string, in the program. The store code generation unit generates, as a substitute for each of a plurality of the append instructions detected by the append instruction detection unit, a store code for storing data of an appendant character string to be appended to the string variable by the append instruction into a buffer. The plurality of append instructions append the character strings to the same string variable. The append code generation unit generates an append code for appending a plurality of the appendant character strings to the string variable, at a position to be executed before an instruction to refer to the string variable in the program. Furthermore, a compiler program and a recording medium having the compiler program recorded thereon are also provided.

Note that the above-described summary of the invention does not list all features necessary for the present invention and that subcombinations of these features can be also included in the present invention.

BRIEF DESCRIPTION-OF THE DRAWINGS

Figure 2:
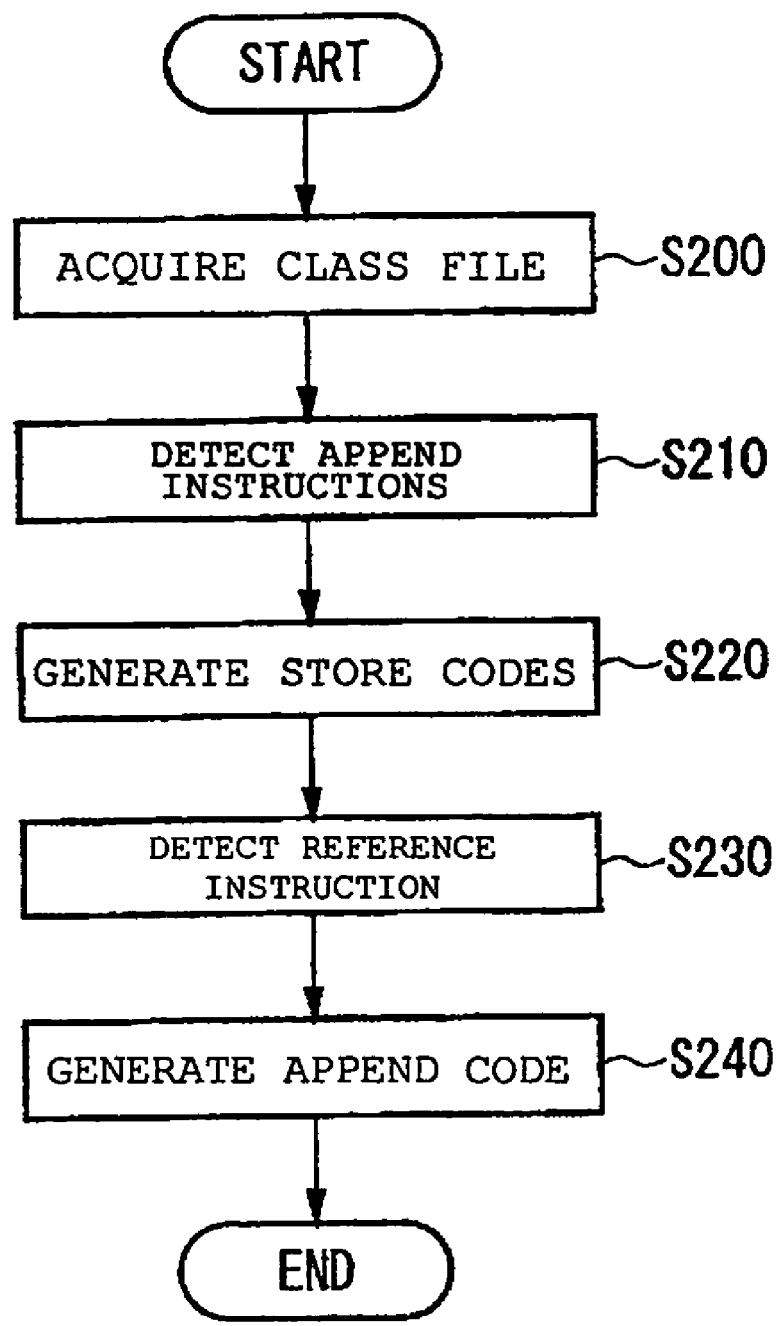
Figure 3:
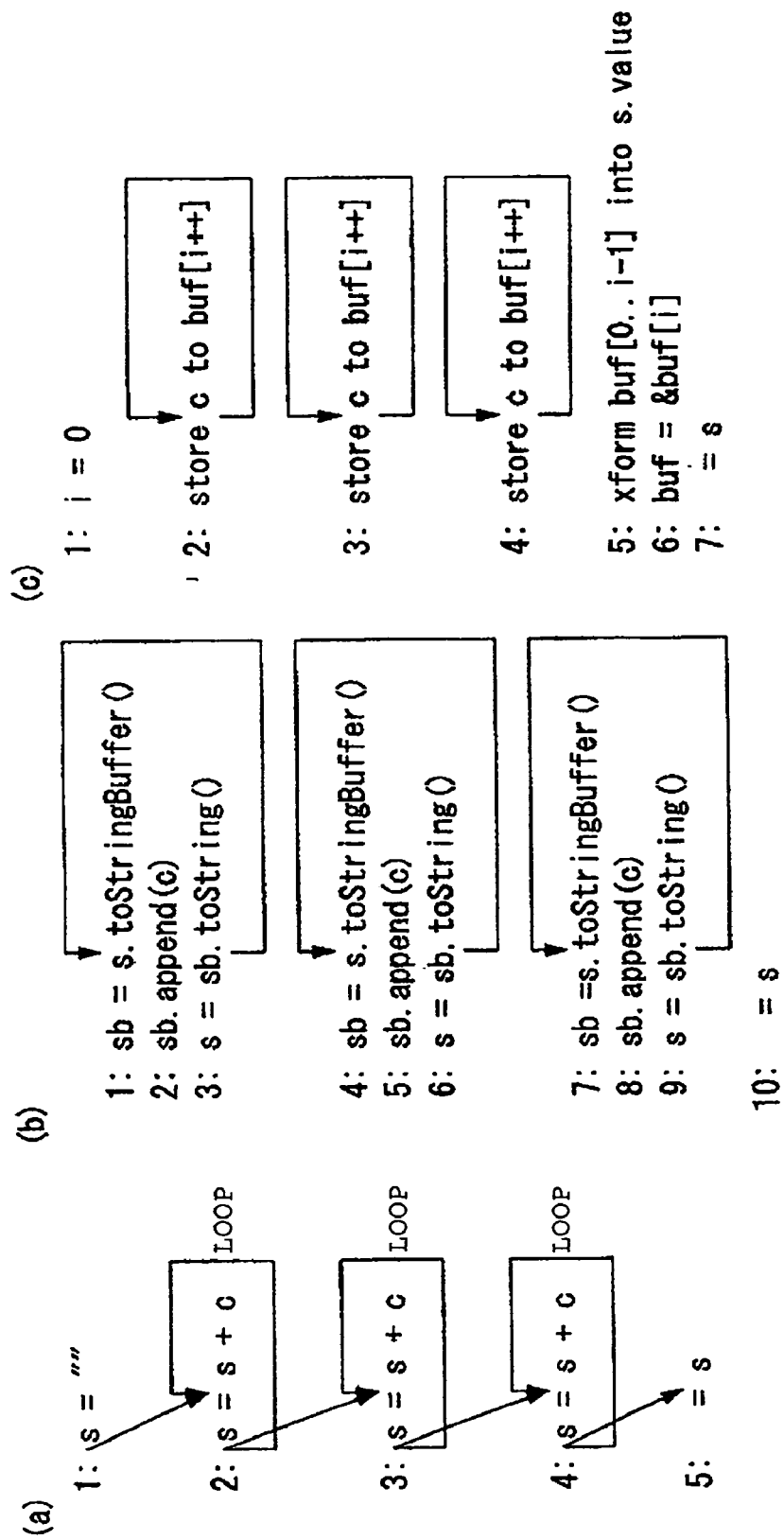
Figure 6:
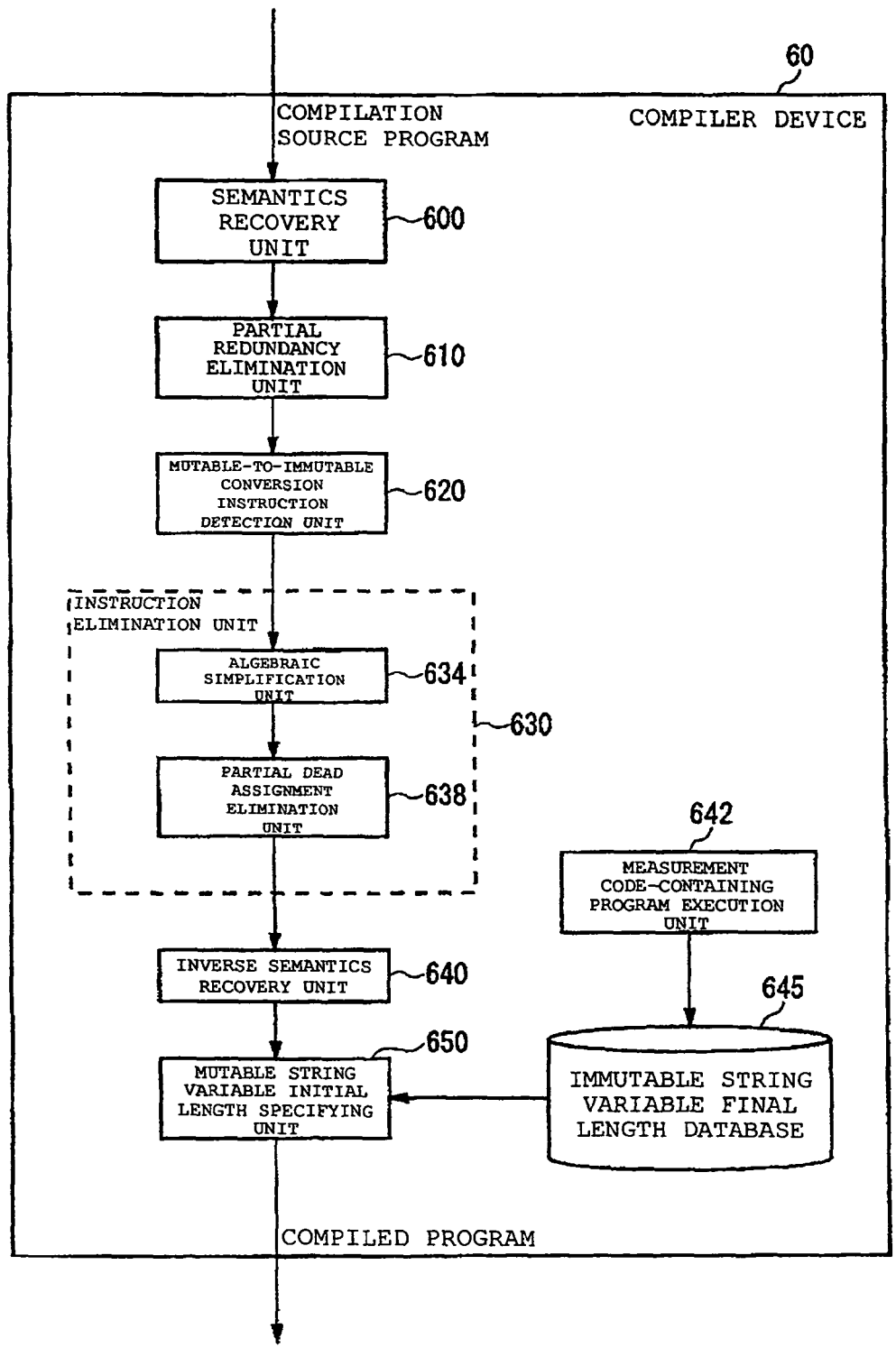
Figure 7:
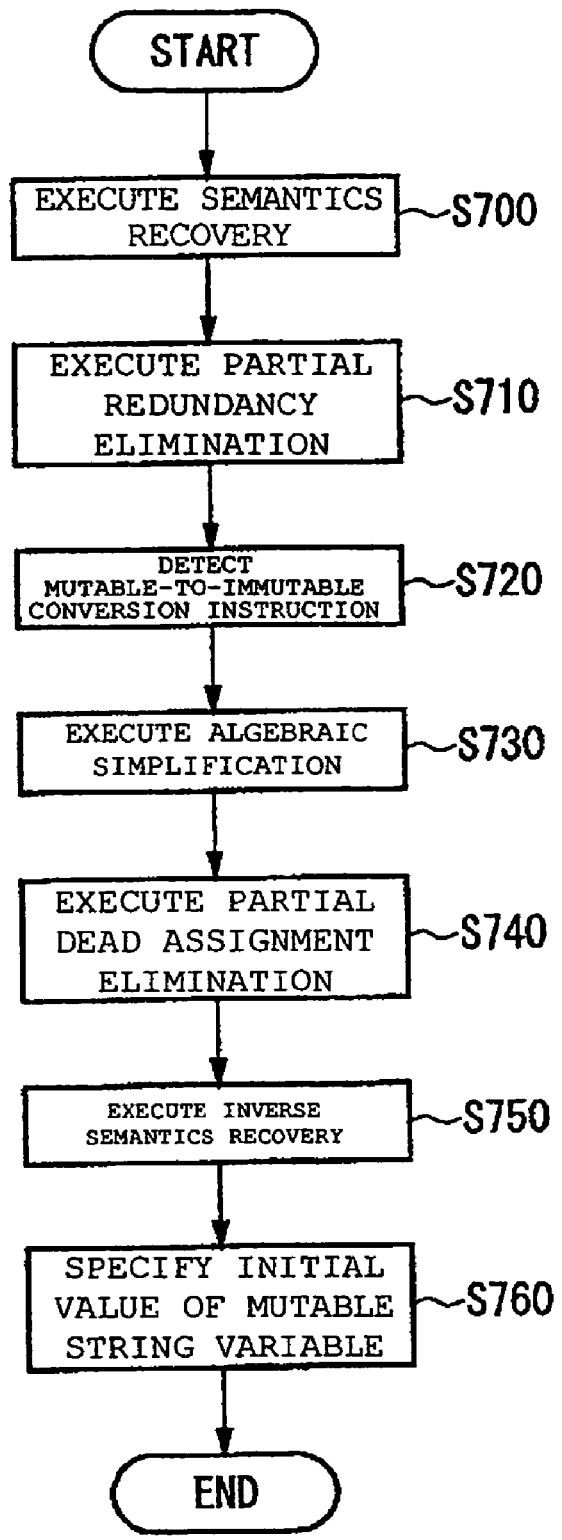
Figure 8:
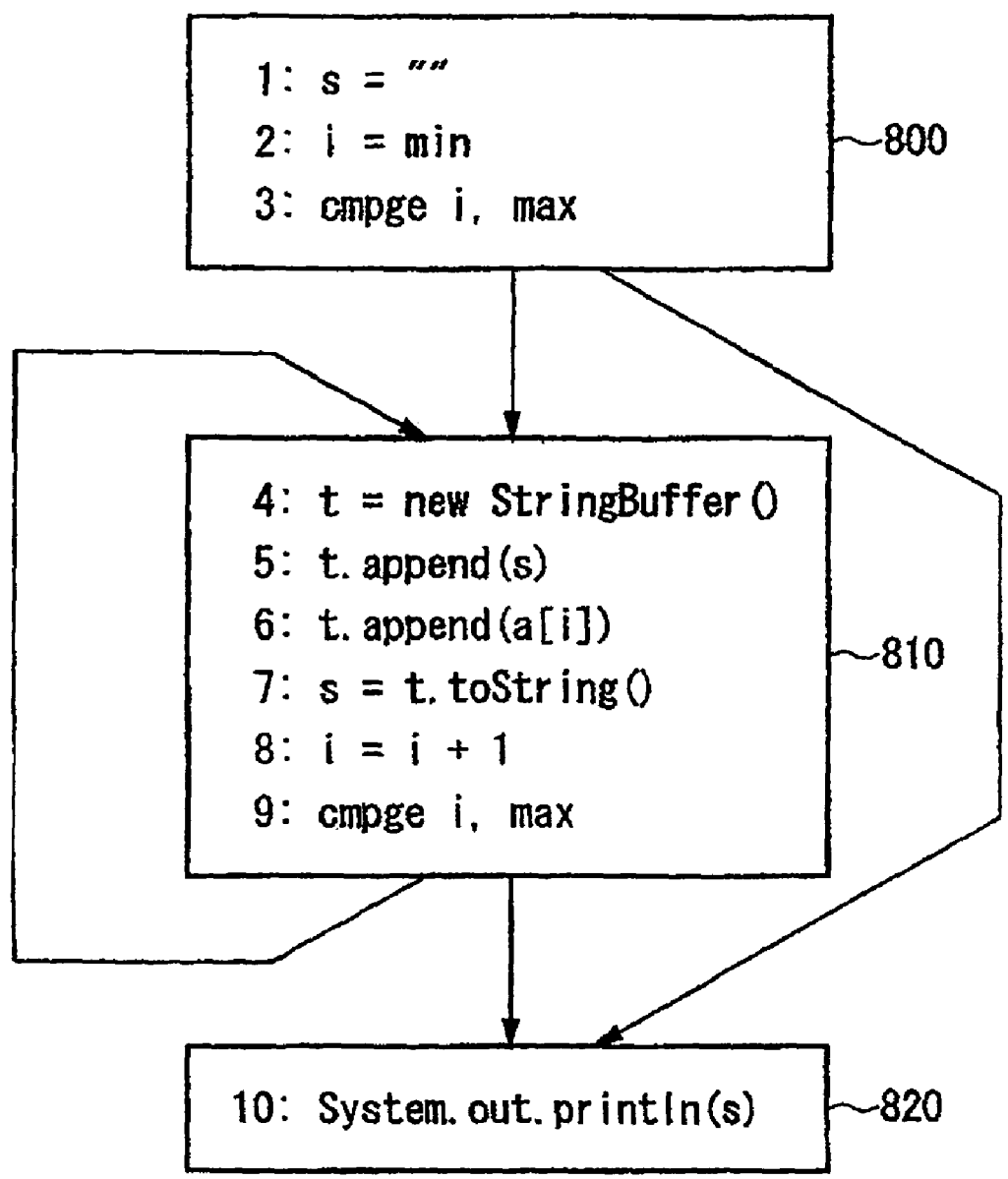
Figure 9:
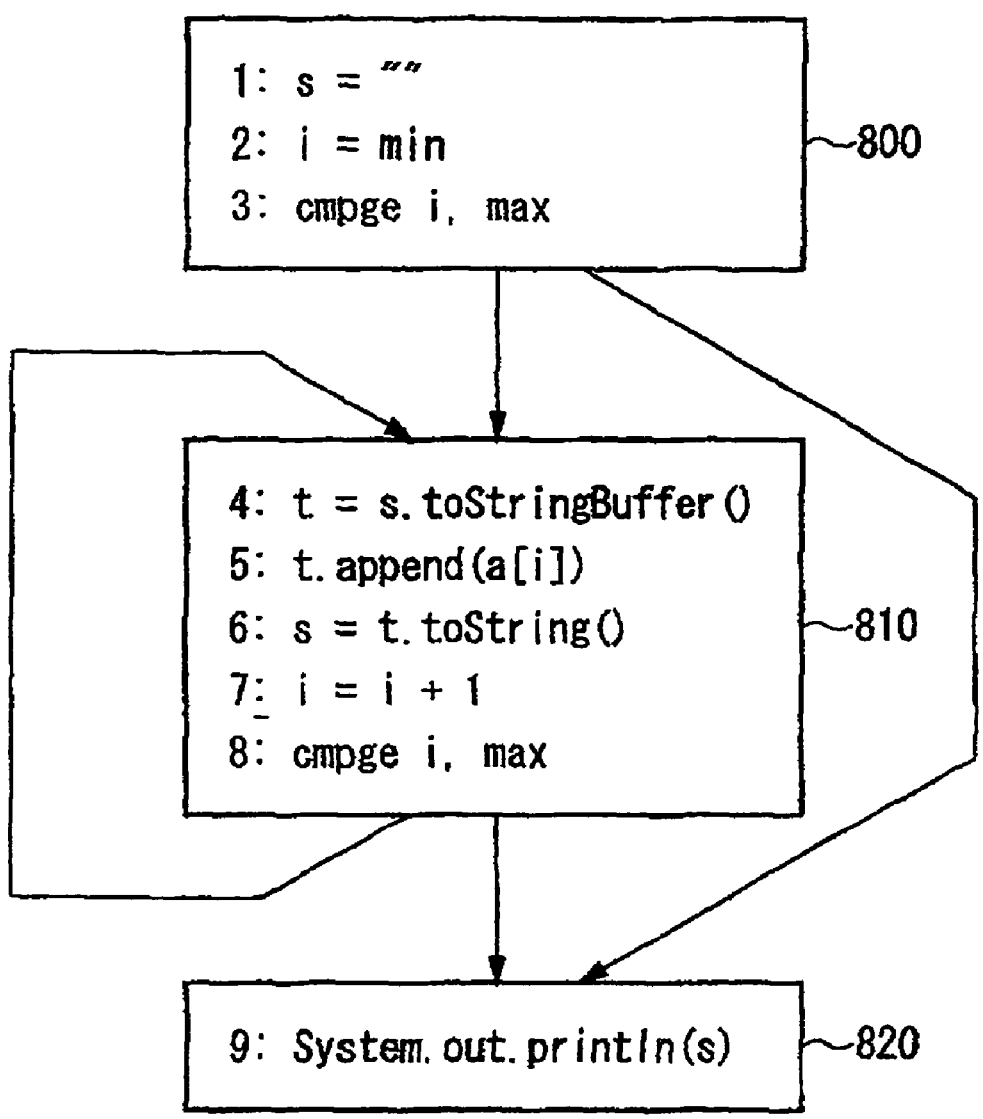
Figure 10:
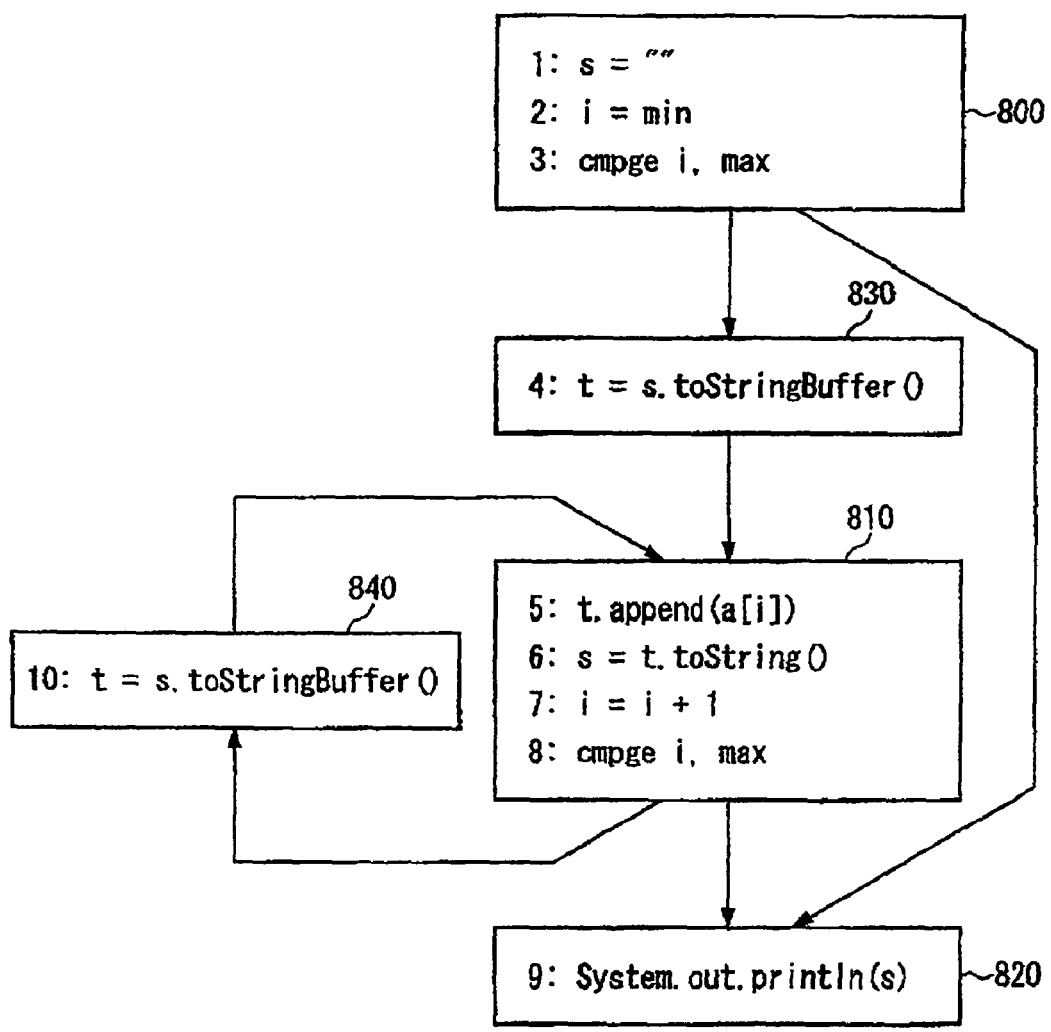
Figure 11:
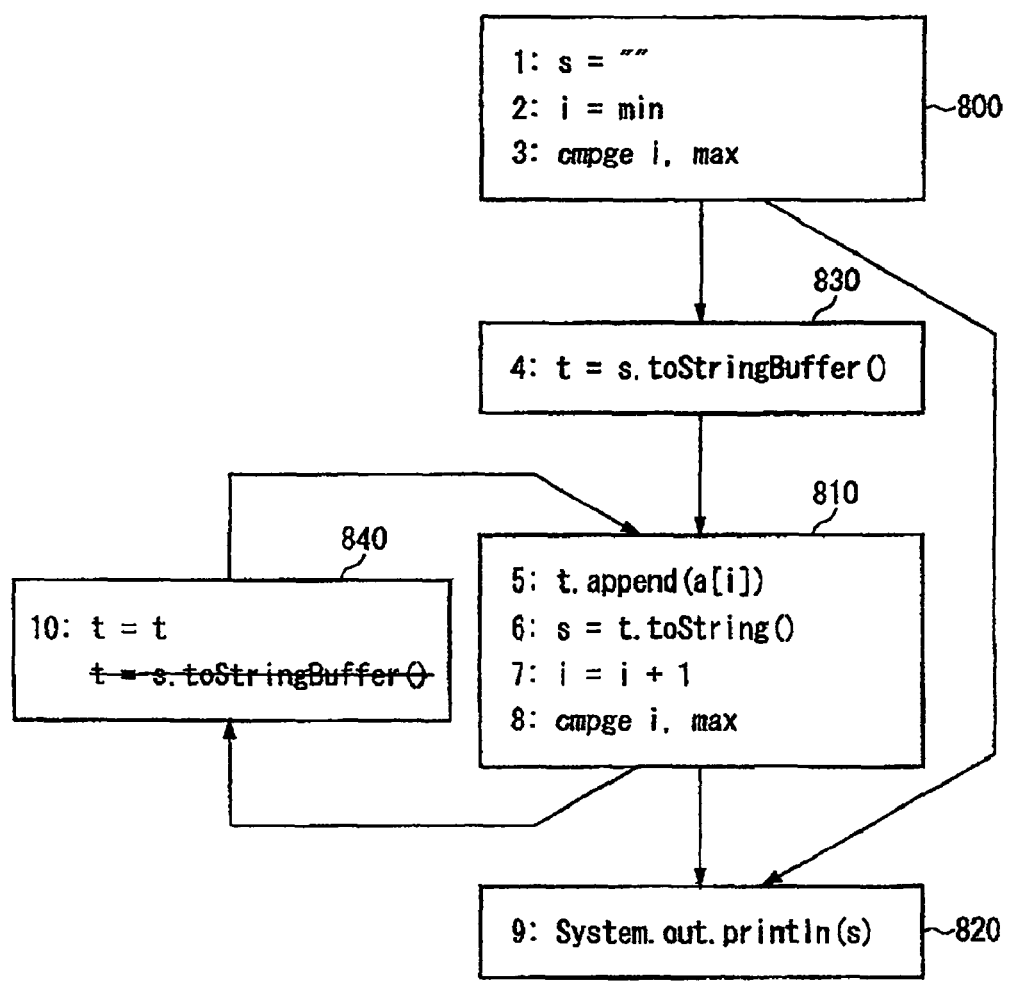
Figure 12:
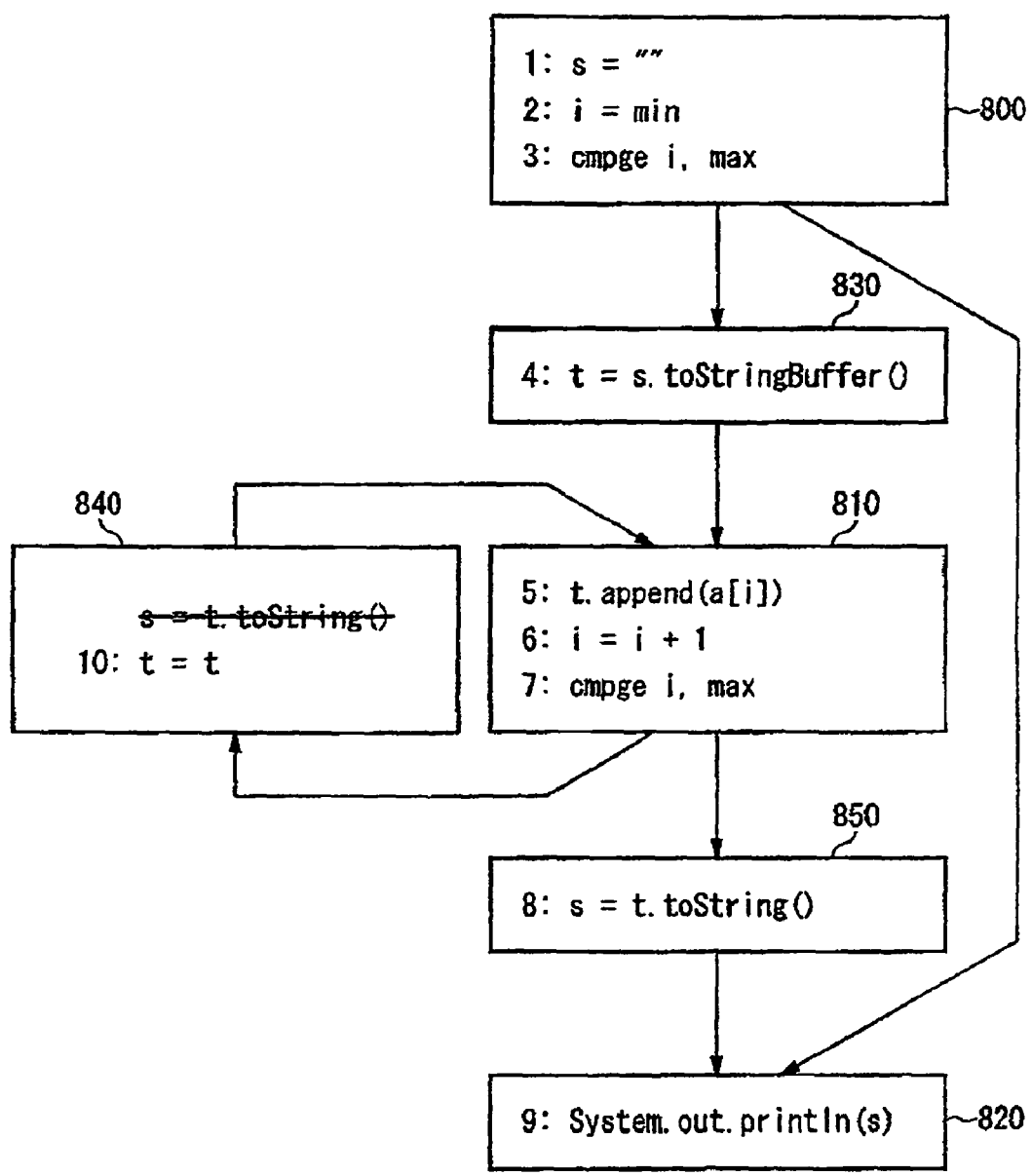
Figure 13:
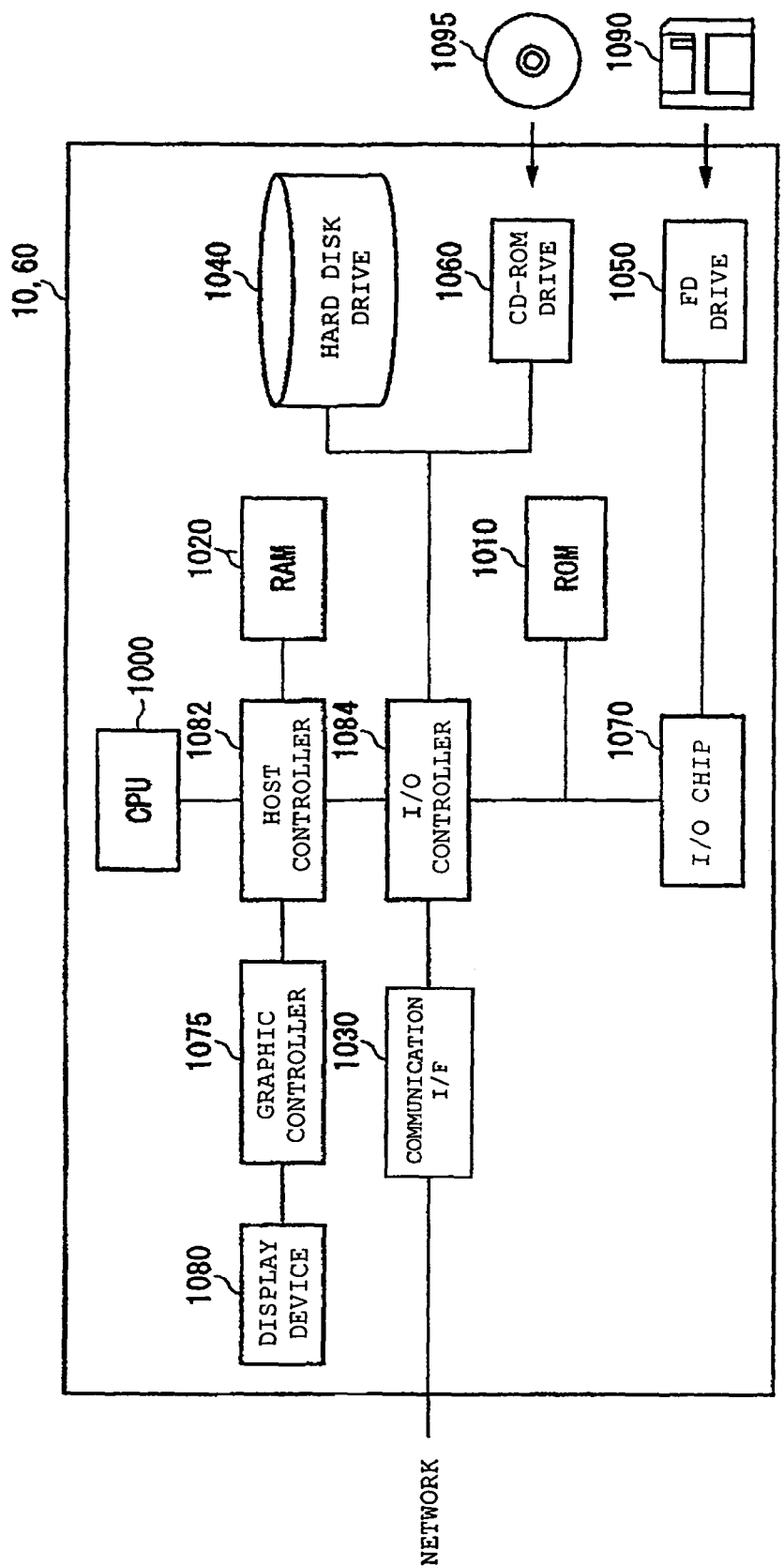

For a more complete understanding of the present invention and the advantages thereof reference is now made to the following description taken in conjunction with the accompanying drawings, in which:

FIG. 1 shows a block diagram of a compiler device 10;
FIG. 2 shows an operation flow of the compiler device 10;
FIG. 3A shows an example of the source code of a program to be optimized;
FIG. 3B shows the result of compiling the program;
FIG. 3C shows an example of a program which has finished being optimized by the compiler device 10;
FIG. 4 shows an example where the compiler device 10 optimizes a program in a modified example;
FIG. 5A shows the result of optimizing a program in a first other method;
FIG. 5B shows the result of optimizing a program in a second other method;
FIG. 6 shows a block diagram of a compiler device 60;
FIG. 7 shows an operation flow of the compiler device 60;
FIG. 8 shows an example of a program to be optimized by the compiler device 60;
FIG. 9 shows an example of a program obtained after a semantics recovery unit 600 has detected an immutable-to-mutable conversion instruction;
FIG. 10 shows an example of a program obtained after a partial redundancy elimination unit 610 has eliminated partial redundancy;
FIG. 11 shows an example of a program obtained after an instruction elimination unit 630 has eliminated the immutable-to-mutable conversion instruction;
FIG. 12 shows an example of a program obtained after the instruction elimination unit 630 has eliminated a mutable-to-immutable conversion instruction; and
FIG. 13 shows an example of the hardware configuration of the compiler device 10 or 60.

DETAILED DESCRIPTION OF THE INVENTION

The present invention provide methods, apparatus and systems for a compiler device, a compiler program, and a recording medium which are capable of solving the above-described problems. In an example embodiment, a compiler device for optimizing a program which manipulates a character string is provided. The compiler device includes an append instruction detection unit, a store code generation unit, and an append code generation unit. The append instruction detection unit detects an append instruction which appends a character string to a string variable for storing a character string, in the program. The store code generation unit generates, as a substitute for each of a plurality of the append instructions detected by the append instruction detection unit, a store code for storing data of an appendant character string to be appended to the string variable by the append instruction into a buffer. The plurality of append instructions append the character strings to the same string variable. The append code generation unit generates an append code for appending a plurality of the appendant character strings to the string variable, at a position to be executed before an instruction to refer to the string variable in the program. Furthermore, a compiler program and a recording medium having the compiler program recorded thereon are also provided.

Hereinafter, the present invention will be described through embodiments thereof. However, the embodiments below are not intended to limit the invention according to the appended claims. Moreover, all combinations of features described in the embodiments are not always necessary for solving means of the invention.

First Embodiment

FIG. 1 is a block diagram of a compiler device 10. The compiler device 10 is, for example, a Java (trademark) Just-In-Time compiler. An aspect of the compiler device 10 is to optimize append instructions which append character strings to a string variable for storing a character string. The compiler device 10 includes an append instruction detection unit 100 for detecting an append instruction, a store code generation unit 110 for generating a store code which stores data of an appendant character string to be appended to a string variable by the append instruction into a buffer, a reference instruction detection unit 120 for detecting a reference instruction which refers to the string variable, and an append code generation unit 130 for generating an append code which appends the appendant character strings stored in the buffer to the string variable.

Upon acquiring a compilation source program, the append instruction detection unit 100 detects a plurality of append instructions which append character strings to the same string variable in the program, and then transmits a detection result to the store code generation unit 110 and the reference instruction detection unit 120. Based on the detection result of the append instructions, the store code generation unit 110 generates, as a substitute for each of the plurality of append instructions in the compilation source program which have been detected by the append instruction detection unit 100, a store code which stores data of each appendant character string to be appended to the string variable by the append instruction into a buffer. The store code generation unit 110 then transmits the program containing the generated store codes to the append code generation unit 130.

Based on the detection result of append instructions, the reference instruction detection unit 120 detects a reference instruction in the compilation source program which first refers to the string variable after the character strings have been appended to the string variable by the plurality of append instructions, and then transmits a detection result to the append code generation unit 130. Based on the detection result of the reference instruction, the append code generation unit 130 generates an append code which appends the plurality of appendant character strings to the string variable, at a position to be executed after all the store codes and before the reference instruction in the program received from the store code generation unit 110. The append code generation unit 130 then outputs, as a compiled program, the program containing the generated append code. Note that the compiler device 10 may execute other optimization before or after the process executed by each unit in FIG. 1.

FIG. 2 shows an operation flow of the compiler device 10. The compiler device 10 acquires, for example, a class file containing a compilation source program in Java (trademark) (S200). Next, the append instruction detection unit 100 detects a plurality of append instructions which append character strings to the same string variable (S210). The store code generation unit 110 generates, as a substitute for each of the plurality of append instructions in the compilation source program which have been detected by the append instruction detection unit 100, a store code which stores data of each appendant character string to be appended to the string variable by the append instruction into a buffer (S220). The reference instruction detection unit 120 detects a reference instruction which first refers to the string variable after the character strings have been appended to the string variable by the plurality of append instructions (S230). The append code generation unit 130 then generates an append code which appends the plurality of appendant character strings to the string variable, at a position to be executed after all the store codes and before the reference instruction (S240).

FIG. 3A shows an example of source codes of a program to be optimized. The instruction on the first line assigns an empty character string " " to a string variable s, which is an example of string variables. Each of the instructions on the second to fourth lines is an instruction which concatinates an appendant character string stored in a variable c with the string variable s and assigns a result thereof to the string variable s, i.e., an append instruction which appends the appendant character string stored in the variable c to the string variable S. Note that the instructions on the second to fourth lines may be the same append instruction which is repeatedly executed by a loop, on the source code. The instruction on the fifth line is a reference instruction which first refers to the string variable s after the character strings have been appended to the string variable s by the append instructions on the second to fourth lines.

FIG. 3B shows a result of compiling the program. To be more specific, for example, this drawing shows an example of the result of compiling the source code shown in FIG. 3A into bytecode by a bytecode compiler in Java (trademark). Incidentally, although the bytecode compiler actually outputs bytecode in which each instruction is represented by numeric data, FIG. 3B shows pseudo-code representing the semantics of bytecode for convenience of explanation. Note that, in FIGS. 5A and 5B, and FIGS. 8 to 12 to be explained later, pseudo-code representing the semantics of instructions will be also used for convenience of explanation.

The instruction on the first line is an instruction which converts an immutable string variable s where appending a character string is not allowed, into a mutable string variable sb where appending a character string is allowed. For example, the instruction on the first line reserves an area in memory for storing the mutable string variable sb where appending a character string is allowed, and copies a character string stored in the immutable string variable s where appending a character string is not allowed, to the mutable string variable sb. The instruction on the second line appends an appendant character string stored in a variable c to the mutable string variable sb. Incidentally, if the variable c is not a character variable, there may be cases where another immutable string variable is further reserved in a further process of executing a value Of method in addition to the instruction on the second line. The instruction on the third line converts the mutable string variable sb into the immutable string variable s. Similarly to the above, the respective instructions on the fourth and seventh lines are the same as that on the first line. The respective instructions on the fifth and eighth lines are the same as that on the second line. The respective instructions on the sixth and ninth lines are the same as that on the third line. The instruction on the tenth line is an instruction which refers to the immutable string variable s.

As described above, the instruction which newly appends the character string c to the immutable string variable s is compiled into a plurality of instructions including area reservation in memory and copying of data. According to the program in FIG. 3B, the area reservation for a variable which is ultimately not used is repeated by a loop. For example, the area reservation for the ultimately unnecessary variables sb is repeated on the first, fourth, and seventh lines. Furthermore, a process of initializing the newly reserved memory area is required, thus lowering efficiency. Moreover, if the compiler device 10 performs dynamic memory management, an unnecessary memory area is frequently released by garbage collection, thus lowering the efficiency.

Here, the mutable string variable where a process of appending a character string is allowed is a variable where manipulation of appending a character string is allowed by the specifications of a program language. An example thereof is an instance of a StringBuffer object in the Java (trademark) language. Moreover, if the program language is an object-oriented language, a mutable string object containing the mutable string variable may have a method of newly appending a character string to a character string stored in the mutable string variable, e.g., an append method.

On the other hand, the immutable string variable where a process of appending a character string is not allowed is a variable where manipulation of appending a character string is not allowed by the specifications of a program language. An example thereof is an instance of a String object in the Java (trademark) language. The compiler device 10 can execute a compilation process assuming that a character string stored in the immutable string variable does not change, thus improving the efficiency. For example, the compiler device 10 does not require exclusive control for accessing the immutable string variable, thus enabling high-speed execution.

FIG. 3C shows an example of a program which has finished being optimized by the compiler device 10. The append instruction detection unit 100 detects, as an append instruction, a combination of the instruction on the first line in FIG. 3B which converts the immutable string variable s into the mutable string variable sb, the instruction on the second line in FIG. 3B which appends the appendant character string c to the mutable string variable sb, and the instruction on the third line in FIG. 3B which converts the mutable string variable sb into the immutable string variable S. The store code generation unit 110 then generates, as a substitute for the append instruction, a store code which stores data of the appendant character string c into a buffer, e.g., the instruction on the second line in FIG. 3C.

Here, the buffer is an area in memory which is previously reserved for each thread executing a program. Since the buffer is not used only for the execution of the program shown in FIG. 3C but also for other processes on the same thread, it is desired that the buffer has a size sufficiently larger than the data size of a character. For example, the buffer size may be 1 Mbyte or 10 Mbyte. Further, the variable buf shown in FIG. 3C is a variable which stores a starting address of a free space in the buffer.

The append code generation unit 130 generates an append code which appends a plurality of the appendant character strings to the string variable, at a position to be executed before the instruction on the seventh line which refers to the immutable string variable s, e.g., on the fifth line. For example, the append code generation unit 130 generates, as the append code, an instruction which assigns addresses of the buffer storing the appendant character strings to an instance variable (s. value) of the object containing the immutable string variable. As a result, the instruction on the seventh line can appropriately refer to the string variable obtained after the appending process has been finished. It is desirable that the append code generation unit 130 further generates a code which executes a process of updating information indicating a free space in the buffer, in case the thread executing the program shown in FIG. 3C further executes another program after the program shown in FIG. 3C. For example, the append code generation unit 130 can appropriately notify a code to be executed later of a free space in the buffer by generating an instruction which updates a value of the variable buf, on the sixth line.

As described above, the compiler device 10 can optimize an append instruction which appends a character string, by eliminating an instruction which reserves an area in memory for a mutable string variable and an instruction which copies data of the character string.

Incidentally, in the present embodiment, the compiler device 10 is, for example, a Just-In-Time compiler which compiles bytecode into executable code. Instead of this, the compiler device 10 may be a bytecode compiler which compiles a source program into bytecode. In this case, the append instruction detection unit 100 detects, as an append instruction, a "+" operator which appends character string to a string variable, in a source program. Then, the store code generation unit 110 generates a store code as a substitute for the "+" operator. In other words, the compiler device 10 may output bytecode which executes substantially the same process as that of FIG. 3C by use of the source program shown in FIG. 3A as input without involving the program shown in FIG. 3B.

FIG. 4 shows an modified example where the compiler device 10 optimizes a program. The compiler device 10 in the present example may generate the program shown in FIG. 4 instead of the program shown in FIG. 3C.

The compiler device 10 generates the instruction on the first line which initializes the buffer. The variable buf has a linked list structure, and each element of the linked list can store one appendant character string. The store code generation unit 110 generates, as a substitute for the append instruction in FIG. 3A and as a store code, the instruction on the second line in FIG. 4 which stores data of the appendant character string c into the buffer and the instruction on the third line in FIG. 4 which acquires an address indicating the next element in the linked list. Similarly to the above, the store code generation unit 110 generates, as substitutes for the respective append instructions, store codes at the fourth and sixth lines. The append code generation unit 130 then generates an append code which appends the plurality of appendant character strings to the string variable, at a position to be executed before the instruction on the ninth line which refers to the immutable string variable s, e.g., on the eighth line.

As described above, the store code generation unit 110 may store, as substitutes for the plurality of append instructions, combinations of the appendant character strings and the addresses where the appendant character strings are stored, in the form of a linked list into the buffer. In this case, if the linked list is previously terminated by a null pointer, the compiler device 10 can detect the end of the linked list by detecting a memory access violation. This makes it possible to omit an instruction to check the end of the linked list in each store code. Accordingly, the process can be executed at high speed.

FIG. 5A shows a result of optimizing the program in a first other method. To be more specific, in the present example, an expert Java (trademark) programmer has described a process of appending character strings without using "+" operators in order to improve the execution efficiency of character string manipulation. The instruction on the first line is an instruction which reserves an area in memory for storing a mutable string variable sb and copies a character string stored in an immutable string variable s to the mutable string variable sb. The instruction on the second line appends an appendant character string stored in a variable c to the mutable string variable sb. Similarly to the above, the respective instructions on the third and fourth lines are the same as that on the second line. The instruction on the fifth line converts the mutable string variable sb into the immutable string variable s. The instruction on the sixth line refers to the immutable string variable s.

As described above, according to the present example, a code which appends a character string to a mutable string variable is used instead of an append instruction. Therefore, the program according to the present example has a higher performance than the program shown in FIG. 3B.

FIG. 5B shows a result of optimizing the program in a second other method. In the present example, a String object containing an immutable string variable has a private string constructor, which is not specified in the language specifications of Java (trademark). With the private string constructor, another String object can be newly generated, and a character string obtained by concatenating a plurality of String objects can be copied to the newly generated String object. For example, each of the instructions on the second to fourth lines is an instruction which newly generates an immutable string variable and copies contents of two immutable string variables to the newly generated immutable string variable.

Thus, a conversion process into a mutable string variable can be omitted. Accordingly, the program shown in the present example has a higher performance than the program shown in FIG. 3B. However, although an area for storing an immutable string variable is reserved on each of the second to fourth lines, the instruction on the fifth line refers to only the immutable string variable generated by the instruction on the fourth line. Therefore, the program shown in the present example is still redundant.

On the other hand, the compiler device 10 can appropriately optimize an instruction which manipulates a character string, by eliminating redundant instructions to reserve memory and redundant conversion processes.

A Second Embodiment

FIG. 6 shows a block diagram of a compiler device 60. The compiler device 60 is, for example, a Java (trademark) Just-In-Time compiler. An object of the compiler device 60 is to optimize append instructions which append character strings to a string variable for storing a character string. The compiler device 60 includes a semantics recovery unit 600, which is an example of an immutable-to-mutable conversion instruction detection unit for detecting an immutable-to-mutable conversion instruction which converts an immutable string variable into a mutable string variable; a partial redundancy elimination unit 610 for executing a partial redundancy elimination process; a mutable-to-immutable conversion instruction detection unit 620 for detecting a mutable-to-immutable conversion instruction which converts the mutable string variable into the immutable string variable; an instruction elimination unit 630 for eliminating the immutable-to-mutable conversion instruction; an inverse semantics recovery unit 640 for converting the detected immutable-to-mutable conversion instruction into an executable state; a measurement code-containing program execution unit 642 for executing a compilation source program to acquire a profile data; an immutable string variable final length database 645 for storing the profile data; and a mutable string variable initial length specifying unit 650 for specifying the initial length of the mutable string variable.

Upon acquiring a compilation source program, the semantics recovery unit 600 detects an immutable-to-mutable conversion instruction which converts an immutable string variable into a mutable string variable. To be more specific, for example, the semantics recovery unit 600 detects a combination of a plurality of instructions which collectively realize a function of the immutable-to-mutable conversion instruction, and converts the combination of the instructions into a pseudo-instruction representing the immutable-to-mutable conversion instruction. The semantics recovery unit 600 then transmits the program containing the pseudo-instruction obtained by the conversion to the partial redundancy elimination unit 610.

Upon receiving the program containing the pseudo-instruction from the semantics recovery unit 600, the partial redundancy elimination unit 610 executes a partial redundancy elimination process of moving the immutable-to-mutable conversion instruction detected by the semantics recovery unit 600 to the respective control flow edges which merge into a single basic block before the immutable-to-mutable conversion instruction. Note that "moving" means changing the order of executing instructions by eliminating the immutable-to-mutable conversion instruction in the received program and by inserting the immutable-to-mutable conversion instruction into each control flow edge which merges into a single basic block. The partial redundancy elimination unit 610 then transmits the program obtained after the partial redundancy elimination process has been executed, to the mutable-to-immutable conversion instruction detection unit 620.

The mutable-to-immutable conversion instruction detection unit 620 detects a mutable-to-immutable conversion instruction which converts the mutable string variable into the immutable string variable in the program received from the partial redundancy elimination unit 610. The mutable-to-immutable conversion instruction detection unit 620 then transmits the program received from the partial redundancy elimination unit 610 with a detection result to the instruction elimination unit 630.

The instruction elimination unit 630 has an algebraic simplification unit 634 and a partial dead assignment elimination unit 638. Upon receiving the program from the mutable-to-immutable conversion instruction detection unit 620, the algebraic simplification unit 634 eliminates the immutable-to-mutable conversion instruction by using an algebraic simplification method. For example, the algebraic simplification unit 634 eliminates the immutable-to-mutable conversion instruction by using an algebraic property that "if the result of converting a mutable string variable t into an immutable string variable is s, then the result of converting the immutable string variable s is t." Specifically, the algebraic simplification unit 634 eliminates the immutable-to-mutable conversion instruction if instructions to be executed between the mutable-to-immutable conversion instruction and the immutable-to-mutable conversion instruction do not modify a character string stored in the mutable string variable as the source variable of the mutable-to-immutable conversion instruction, and if instructions to be executed between the immutable-to-mutable conversion instruction and the use of the mutable string variable obtained from the conversion by the immutable-to-mutable conversion instruction do not modify any of the mutable string variable as the source variable of the mutable-to-immutable conversion instruction and the mutable string variable obtained from the conversion by the immutable-to-mutable conversion instruction. Moreover, the algebraic simplification unit 634 causes the mutable string variable as the source variable of the mutable-to-immutable conversion instruction to be used as the mutable string variable obtained from the conversion by the immutable-to-mutable conversion instruction after the immutable-to-mutable conversion instruction. Thereafter, the algebraic simplification unit 634 transmits the program from which the immutable-to-mutable conversion instruction has been eliminated, to the partial dead assignment elimination unit 638.

The partial dead assignment elimination unit 638 executes the following process as a partial dead assignment elimination process. The partial dead assignment elimination unit 638 moves the mutable-to-immutable conversion instruction to each branch destination of a branch instruction to be executed after the mutable-to-immutable conversion instruction. The partial dead assignment elimination unit 638 eliminates the mutable-to-immutable conversion instruction if a character string stored in the immutable string variable as the destination variable of the mutable-to-immutable conversion instruction is not referred to on each branch destination of the branch instruction. Subsequently, the partial dead assignment elimination unit 638 transmits the program obtained after the partial dead assignment elimination process has been executed, to the inverse semantics recovery unit 640.

The inverse semantics recovery unit 640 executes a conversion process of converting the mutable-to-immutable conversion instruction obtained from the conversion by the mutable-to-immutable conversion instruction detection unit 620 back into a combination of a plurality of instructions which collectively realize a function of the mutable-to-immutable conversion instruction. The inverse semantics recovery unit 640 then transmits the program as a conversion result to the mutable string variable initial length specifying unit 650.

The measurement code-containing program execution unit 642 previously executes the compilation source program and measures an execution status thereof in order to improve efficiency of the compiled program to be generated by the compiler device 60. For example, the measurement code-containing program execution unit 642 measures lengths of character strings actually stored in the string variables to store a measurement result into the immutable string variable final length database 645.

The mutable string variable initial length specifying unit 650 receives the compilation source program from the inverse semantics recovery unit 640, and receives size information indicating the length of the character string actually stored in the mutable string variable, from the immutable string variable final length database 645. If a mutable string variable is newly generated, then the mutable string variable initial length specifying unit 650 sets an initial length of a mutable string variable such that an area equivalent to the length indicated by the size information is previously reserved. This enables the compiler device 60 to prevent a memory area for a mutable string variable from expanding during the execution of the program. Subsequently, the mutable string variable initial length specifying unit 650 outputs, as a compiled program, the program in which the initial length of a mutable string variable has been set.

Incidentally, the compiler device 60 need not include the measurement code-containing program execution unit 642, the immutable string variable final length database 645, and the mutable string variable initial length specifying unit 650. In this case, the compiler device 60 may use, as an initial length of a mutable string variable, a value previously set by the designer of the compiler device 60.

FIG. 7 shows an operation flow of the compiler device 60. The semantics recovery unit 600 detects a combination of a plurality of instructions which collectively realize a function of an immutable-to-mutable conversion instruction, and executes semantics recovery which converts the combination of the instructions into a pseudo-instruction representing the immutable-to-mutable conversion instruction, thereby detecting the immutable-to-mutable conversion instruction which converts an immutable string variable into a mutable string variable (S700). Upon receiving a program containing the pseudo-instruction from the semantics recovery unit 600, the partial redundancy elimination unit 610 executes a partial redundancy elimination process of moving the immutable-to-mutable conversion instruction detected by the semantics recovery unit 600 to each control flow edge which merges into a single basic block before the immutable-to-mutable conversion instruction (S710). The mutable-to-immutable conversion instruction detection unit 620 detects a mutable-to-immutable conversion instruction which converts the mutable string variable into the immutable string variable in the program received from the partial redundancy elimination unit 610 (S720).

The algebraic simplification unit 634 eliminates the immutable-to-mutable conversion instruction by using an algebraic simplification method. For example, the algebraic simplification unit 634 eliminates the immutable-to-mutable conversion instruction if instructions to be executed between the mutable-to-immutable conversion instruction and the immutable-to-mutable conversion instruction do not modify a character string stored in the mutable string variable as the source variable of the mutable-to-immutable conversion instruction, and if instructions to be executed between the immutable-to-mutable conversion instruction and the use of the mutable string variable obtained from the conversion by the immutable-to-mutable conversion instruction do not modify any of the mutable string variable as the source variable of the mutable-to-immutable conversion instruction and the mutable string variable obtained from the conversion by the immutable-to-mutable conversion instruction. Moreover, the algebraic simplification unit 634 causes the mutable string variable as the source variable of the mutable-to-immutable conversion instruction to be used as the mutable string variable obtained from the conversion by the immutable-to-mutable conversion instruction after a position where the eliminated immutable-to-mutable conversion instruction existed (S730).

The partial dead assignment elimination unit 638 changes the order of executing instructions such that the mutable-to-immutable conversion instruction is executed on each branch destination of a branch instruction executed after the mutable-to-immutable conversion instruction. The partial dead assignment elimination unit 638 then executes a partial dead assignment elimination process of eliminating the mutable-to-immutable conversion instruction if a character string stored in the immutable string variable as the destination variable of the mutable-to-immutable conversion instruction is not referred to on each branch destination of the branch instruction (S740).

The inverse semantics recovery unit 640 executes a conversion process of converting the immutable-to-mutable conversion instruction obtained from the conversion by the semantics recovery unit 600 back into a combination of a plurality of instructions which collectively realize a function of the immutable-to-mutable conversion instruction (S750). The mutable string variable initial length specifying unit 650 sets an initial length of a mutable string variable based on size information indicating the length of the character string actually stored in the mutable string variable (S760). The length of the character string actually stored in the mutable string variable is previously measured by the measurement code-containing program execution unit 642.

FIG. 8 shows an example of a program to be optimized by the compiler device 60. The program shown in this drawing has a basic block 800 containing the instructions on the first to third lines, a basic block 810 containing the instructions on the fourth to ninth lines, and a basic block 820 containing the instruction on the tenth line.

The instruction on the first line assigns an empty character string " " to an immutable string variable s, which is an example of immutable string variables. The instruction on the second line assigns a variable min indicating the initial value of an integer type variable i to the integer type variable i. The instruction on the third line is a branch instruction which compares the integer type variable i with a variable max indicating the final value of the integer type variable i, and executes the basic block 820 if the integer type variable i is the variable max or more, but executes the basic block 810 if the integer type variable i is less than the variable max.

The instruction on the fourth line newly reserves an area in memory for a StringBuffer object t containing a mutable string variable. The instruction on the fifth line appends the character string stored in the immutable string variable s to the mutable string variable t. The instruction on the sixth line appends the i-th character string in a string array variable a to the mutable string variable t. The instruction on the seventh line is a mutable-to-immutable conversion instruction which converts the mutable string variable t into the immutable string variable s. The instruction on the eighth line increments the integer type variable i. The instruction on the ninth line is a branch instruction which compares the integer type variable i with the variable max indicating the final value of the integer type variable i, and executes the basic block 820 if the integer type variable i is the variable max or more, but executes the basic block 810 again if the integer type variable i is less than the variable max.

The instruction on the tenth line outputs the character string stored in the immutable string variable s to standard output, e.g., to a console window on a display screen.

FIG. 9 shows an example of a program obtained after the semantics recovery unit 600 has detected an immutable-to-mutable conversion instruction. The semantics recovery unit 600 detects, as the immutable-to-mutable conversion instruction, a combination of the instructions on the fourth and fifth lines in FIG. 8, i.e., a combination of the instruction which reserves a memory area used for a mutable string variable and the instruction which copies an immutable string variable to the mutable string variable. Next, as shown on the fourth line in FIG. 9, the semantics recovery unit 600 replaces the detected immutable-to-mutable conversion instruction with a pseudo-instruction representing an immutable-to-mutable conversion instruction which converts the immutable string variable s into the mutable string variable t. In other words, the semantics recovery unit 600 detects a combination of a plurality of instructions constituting a process of an immutable-to-mutable conversion instruction, and recovers the semantics of the process represented by the plurality of instructions.

Incidentally, the semantics recovery unit 600 detects the immutable-to-mutable conversion instruction by detecting the instructions on the fourth and fifth lines which are sequentially located, in the program. Instead of this, the semantics recovery unit 600 may detect, as a mutable-to-immutable conversion instruction, the instructions on the fourth and fifth lines even if other instructions are located between the instructions on the fourth and fifth lines but if the first manipulation to the newly reserved mutable string variable is the appendant of an immutable character string.

FIG. 10 shows an example of a program obtained after the partial redundancy elimination unit 610 has eliminated partial redundancy. The partial redundancy elimination unit 610 eliminates the immutable-to-mutable conversion instruction on the fourth line from the basic block 810 and inserts the immutable-to-mutable conversion instructions into basic blocks 830 and 840 in order to move the immutable-to-mutable conversion instruction detected by the semantics recovery unit 600 to each control flow edge which merges into a single basic block before the immutable-to-mutable conversion instruction. Incidentally, to be more detailed, the partial redundancy elimination unit 610 may execute, as a partial redundancy elimination process, substantially the same process as that of the technology or the like described in non-patent literature 2. For example, according to an existing technology, the partial redundancy elimination unit 610 moves the immutable-to-mutable conversion instruction farther backward under the condition that the immutable-to-mutable conversion instruction is not executed before an instruction which assigns a value to the variable s, which is the source variable of the immutable-to-mutable conversion instruction.

FIG. 11 shows an example of a program obtained after the instruction elimination unit 630 has eliminated the immutable-to-mutable conversion instruction. The algebraic simplification unit 634 eliminates the immutable-to-mutable conversion instruction moved to the basic block 840, by using an algebraic simplification method. Specifically, the algebraic simplification unit 634 eliminates the immutable-to-mutable conversion instruction in the basic block 840, because, in the control flow from the basic block 810 to the basic block 840, instructions to be executed between the mutable-to-immutable conversion instruction on the sixth line and the immutable-to-mutable conversion instruction on the tenth line in FIG. 10 do not modify the character string stored in the mutable string variable t, and because instructions to be executed between the immutable-to-mutable conversion instruction and the use of the mutable string variable obtained from the conversion by the immutable-to-mutable conversion instruction do not modify any of the mutable string variable as the source variable of the mutable-to-immutable conversion instruction and the mutable string variable obtained from the conversion by the immutable-to-mutable conversion instruction. The algebraic simplification unit 634 then causes the mutable string variable as the source variable of the mutable-to-immutable conversion instruction to be used as the mutable string variable obtained from the conversion by the immutable-to-mutable conversion instruction, after the immutable-to-mutable conversion instruction (instruction on the tenth line).

To be more detailed, the algebraic simplification unit 634 decides whether the character string stored in the mutable string variable t is modified, using an analysis of the relationship between a value definition of a variable and the use of a value stored in the variable, e.g., using a UD/DU chain. Further, under the condition that the mutable string variable t is not accessed by the other threads, the algebraic simplification unit 634 decides that the character string stored in the mutable string variable t is not modified. For example, the algebraic simplification unit 634 may use, as the condition, the fact that the program is executed on a single thread. Alternatively, the algebraic simplification unit 634 may confirm that pointers to the mutable string variable t are not notified to the other threads, by escape analysis.

FIG. 12 shows an example of a program obtained after the instruction elimination unit 630 has eliminated the mutable-to-immutable conversion instruction. The partial dead assignment elimination unit 638 executes the following process as a partial dead assignment elimination process. The partial dead assignment elimination process 638 causes the mutable-to-immutable conversion instruction on the sixth line in FIG. 11 to be executed on each branch destination of a branch instruction which is executed after the mutable-to-immutable conversion instruction, e.g., the instruction on the seventh line. In other words, the partial dead assignment elimination unit 638 eliminates the mutable-to-immutable conversion instruction on the sixth line in FIG. 11 from the basic block 810 and moves the mutable-to-immutable conversion instructions to the basic blocks 840 and 850. Since a character string stored in the immutable string variable s as the destination variable of the mutable-to-immutable conversion instruction moved to the basic block 840 is not referred to in the flow executed after the basic block 840, the partial dead assignment elimination unit 638 eliminates the mutable-to-immutable conversion instruction moved to the basic block 840.

Incidentally, to be more detailed, the partial dead assignment elimination unit 638 may execute, as a partial dead assignment elimination process, substantially the same process as that of the technology or the like described in non-patent literature 1. For example, the partial dead assignment elimination unit 638 moves the mutable-to-immutable conversion instruction further forward under the condition that the mutable-to-immutable conversion instruction is not executed after an instruction which refers to the variable s as the destination variable of the mutable-to-immutable conversion instruction.

FIG. 13 shows an example of the hardware configuration of the compiler device 10 or 60. The compiler device 10 according to the first embodiment or the modified example thereof, or the compiler device 60 according to the second embodiment includes a CPU peripheral unit, an input/output unit, and a legacy input/output unit. The CPU peripheral unit includes a CPU 1000, a RAM 1020, a graphic controller 1075 which are mutually connected by a host controller 1082, and a display device 1080. The input/output unit includes a communication interface 1030, a hard disk drive 1040, and a CD-ROM drive 1060 which are connected to the host controller 1082 by an input/output controller 1084. The legacy input/output unit includes a ROM 1010 connected to the input/output controller 1084, a flexible disk drive 1050, and an input/output chip 1070.

The CPU 1000, the graphic controller 1075 which access the RAM 1020 at high transfer rates, and the RAM 1020 are mutually connected by the host controller 1082. The CPU 1000 operates based on a compiler program stored in the ROM 1010 and the RAM 1020, and controls each unit. The graphic controller 1075 acquires image data which the CPU 1000 or the like generates on a frame buffer provided on the RAM 1020, and displays the image data on the display device 1080. Instead of this, the graphic controller 1075 may include a frame buffer for storing image data generated by the CPU 1000 or the like, inside the graphic controller 1075.

The input/output controller 1084 connects the communication interface 1030 which is a relatively high-speed input/output device, the hard disk drive 1040, and the CD-ROM drive 1060 to the host controller 1082. The communication interface 1030 communicates with other device through a network. The hard disk drive 1040 stores a compiler program and data used by the compiler device 10 or 60. The CD-ROM drive 1060 reads a compiler program or data from a CD-ROM 1095 to provide the compiler program or the data to the input/output chip 1070 through the RAM 1020.

Moreover, the ROM 1010, and relatively low-speed input/output devices, such as the flexible disk drive 1050 and the input/output chip 1070, are connected to the input/output controller 1084. The ROM 1010 stores a boot program executed by the CPU 1000 when the compiler device 10 or 60 is started up, programs depending on the hardware of the compiler device 10 or 60, and the like. The flexible disk drive 1050 reads a compiler program or data from a flexible disk 1090 to provide the compiler program or the data to the input/output chip 1070 through the RAM 1020. The input/output chip 1070 is connected to the flexible disk 1090 and various input/output devices through, for example, a parallel port, a serial port, a keyboard port, a mouse port, and the like.

A compiler program provided to the compiler device 10 or 60 is provided by a user in the state that the compiler program is stored on a recording medium, such as the flexible disk 1090, the CD-ROM 1095, or an IC card. The compiler program is read from the recording medium, installed on the compiler device 10 or 60 through the input/output chip 1070, and executed on the compiler device 10 or 60.

The compiler program installed and executed on the compiler device 10 or 60 includes an append instruction detection module, a store code generation module, a reference instruction detection module, an append code generation module, a mutable-to-immutable conversion instruction detection module, a partial redundancy elimination module, an immutable-to-mutable conversion instruction detection module, an instruction elimination module, an algebraic simplification module, a partial dead assignment elimination module, an inverse semantics recovery module, a measurement code-containing program execution module, and a mutable string variable initial length specifying module. Operations which the compiler device 10 or 60 is actuated to execute by each module are the same as those of the corresponding member in the compiler device 10 or 60 described in FIGS. 1 to 12. Therefore, a description thereof will be omitted.

The above-described compiler program and modules may be stored on an external recording medium. In addition to the flexible disk 1090 and the CD-ROM 1095, optical recording media including DVDs and PDs, magneto-optical recording media including MDs, tape media, semiconductor memories including IC cards, and the like can be used as the recording medium. Moreover, a storage device, such as a hard disk drive or a RAM, which is provided in a server system connected to a dedicated communication network or the Internet, may be used as the recording medium to provide the compiler program to the compiler device 10 or 60 through the network.

As apparent from the above description, the compiler device can optimize instructions which append character strings.

Although the present invention has been described by using the embodiments, the technical scope of the present invention is not limited to the scope described in the aforementioned embodiments. Various modifications and improvements can be made to the aforementioned embodiments. From the appended claims, it is apparent that aspects in which such modifications and improvements are made to the embodiments can be also included in the technical scope of the present invention. For example, the compiler device 10 may further include the members of the compiler device 60. In this case, the compiler device 10 may select any of the functions described in the first and second embodiments, based on a predetermined condition to execute a process. For example, the compiler device 10 may execute a process as follows: if the length of a character string can be measured by the measurement code-containing program execution unit 642, the compiler device 10 executes the processes described in the second embodiment; if the length of a character string cannot be measured, the compiler device 10 executes the processes described in the first embodiment. Moreover, if the variance of the length of a plurality of character strings measured by the measurement code-containing program execution unit 642 is more than a predetermined value, the compiler device 10 may execute the processes described in the first embodiment.

According to all of the above-described embodiments and modified examples, compiler devices, compiler programs, and a recording medium which are shown in the respective items below can be realized.

This includes a compiler device for optimizing a program which manipulates a character string includes an append instruction detection unit for detecting an append instruction to append a character string to a string variable for storing a character string, in the program; a store code generation unit for generating, as a substitute for each of a plurality of the append instructions detected by the append instruction detection unit, a store code for storing data of an appendant character string to be appended to the string variable by the append instruction into a buffer, the plurality of append instructions appending the character strings to the same string variable; and an append code generation unit for generating an append code for appending a plurality of the appendant character strings to the string variable, at a position to be executed before an instruction to refer to the string variable in the program.

In some embodiments, the compiler device further includes a reference instruction detection unit for detecting a reference instruction which first refers to the string variable after the character strings have been appended to the string variable by the plurality of append instructions, wherein the append code generation unit generates the append code at a position to be executed after all the store codes and before the reference instruction.

In some embodiments of the compiler device, the append instruction detection unit detects, as the append instruction, a combination of: an instruction to convert an immutable string variable in which a process of appending a character string is not allowed, into a mutable string variable in which a process of appending a character string is allowed; an instruction to append the appendant character string to the mutable string variable; and an instruction to convert the mutable string variable into the immutable string variable.

Also included is a compiler device for optimizing a program which manipulates a character string includes an append instruction detection unit for detecting an append instruction to append a character string to a string variable for storing a character string, in the program; a store code generation unit for generating, as a substitute for each of a plurality of the append instructions detected by the append instruction detection unit, a store code for storing an address in memory where an appendant character string to be appended to the string variable by the append instruction is stored, into a buffer, the plurality of append instructions appending character strings to the same string variable; and an append code generation unit for generating an append code for appending a plurality of the appendant character strings stored in a plurality of the addresses, to the string variable, at a position to be executed before an instruction to refer to the string variable in the program.

Also included is a compiler device for optimizing a program which manipulates a character string includes a mutable-to-immutable conversion instruction detection unit for detecting a mutable-to-immutable conversion instruction to convert a mutable string variable in which a process of appending a character string is allowed, into an immutable string variable in which a process of appending a character string is not allowed; an immutable-to-mutable conversion instruction detection unit for detecting an immutable-to-mutable conversion instruction to convert the immutable string variable into the mutable string variable; and an instruction elimination unit for eliminating the immutable-to-mutable conversion instruction and for causing the mutable string variable as a source variable of the mutable-to-immutable conversion instruction, to be used as the mutable string variable obtained from conversion by the immutable-to-mutable conversion instruction after the immutable-to-mutable conversion instruction, if an instruction to be executed between the mutable-to-immutable conversion instruction and the immutable-to-mutable conversion instruction does not modify a character string stored in the mutable string variable as the source variable of the mutable-to-immutable conversion instruction and if an instruction to be executed between the immutable-to-mutable conversion instruction and use of the mutable string variable obtained from the conversion by the immutable-to-mutable conversion instruction does not modify any of the mutable string variable as the source variable of the mutable-to-immutable conversion instruction and the mutable string variable obtained from the conversion by the immutable-to-mutable conversion instruction.

In some embodiments of the compiler device, the instruction elimination unit further eliminates the mutable-to-immutable conversion instruction if a character string stored in the immutable string variable is not referred to.

In some embodiments of the compiler device, the instruction elimination unit moves the mutable-to-immutable conversion instruction to each branch destination of a branch instruction to be executed after the mutable-to-immutable conversion instruction, and executes partial dead assignment elimination for eliminating the mutable-to-immutable conversion instruction if a character string stored in the immutable string variable as a destination variable of the mutable-to-immutable conversion instruction is not referred to on each branch destination of the branch instruction.

In some embodiments of the compiler device, the immutable-to-mutable conversion instruction detection unit detects, as the immutable-to-mutable conversion instruction, a combination of: an instruction to reserve a memory area to be used as a mutable string variable; and an instruction to append a character string stored in the immutable string variable to the mutable string variable.

In some embodiments of the compiler device, the compiler device further includes a partial redundancy elimination unit for executing a partial redundancy elimination process of moving the immutable-to-mutable conversion instruction detected by the immutable-to-mutable conversion instruction detection unit to each control flow edge which merges into a single control flow before the immutable-to-mutable conversion instruction, wherein the instruction elimination unit eliminates the immutable-to-mutable conversion instruction, if an instruction to be executed between the mutable-to-immutable conversion instruction and the immutable-to-mutable conversion instruction does not modify a character string stored in the mutable string variable as the source variable of the mutable-to-immutable conversion instruction and if an instruction to be executed between the immutable-to-mutable conversion instruction and the use of the mutable string variable obtained from the conversion by the immutable-to-mutable conversion instruction does not modify any of the mutable string variable as the source variable of the mutable-to-immutable conversion instruction and the mutable string variable obtained from the conversion by the immutable-to-mutable conversion instruction, in a program obtained after the partial redundancy elimination process has been executed.

In some embodiments of the compiler device, the instruction elimination unit moves the mutable-to-immutable conversion instruction to each branch destination of a branch instruction to be executed after the mutable-to-immutable conversion instruction, and executes partial dead assignment elimination for eliminating the mutable-to-immutable conversion instruction if a character string stored in the immutable string variable as a destination variable of the mutable-to-immutable conversion instruction is not referred to on each branch destination of the branch instruction.

Also included is a compiler program for optimizing a program which manipulates a character string, by using a computer causes the computer to function as: an append instruction detection unit for detecting an append instruction to append a character string to a string variable for storing a character string, in the program; a store code generation unit for generating, as a substitute for each of a plurality of the append instructions detected by the append instruction detection unit, a store code for storing data of an appendant character string to be appended to the string variable by the append instruction into a buffer, the plurality of append instructions appending the character strings to the same string variable; and an append code generation unit for generating an append code for appending a plurality of the appendant character strings to the string variable, at a position to be executed before an instruction to refer to the string variable in the program.

Also included is a compiler program for optimizing a program which manipulates a character string, by using a computer causes the computer to function as: an append instruction detection unit for detecting an append instruction to append a character string to a string variable for storing a character string, in the program; a store code generation unit for generating, as a substitute for each of a plurality of the append instructions detected by the append instruction detection unit, a store code for storing an address in memory where an appendant character string to be appended to the string variable by the append instruction is stored, into a buffer, the plurality of append instructions appending the character strings to the same string variable; and an append code generation unit for generating an append code for appending a plurality of the appendant character strings stored in a plurality of the addresses, to the string variable, at a position to be executed before an instruction to refer to the string variable in the program.

Also included is a compiler program for optimizing a program which manipulates a character string, by using a computer causes the computer to function as: a mutable-to-immutable conversion instruction detection unit for detecting a mutable-to-immutable conversion instruction to convert a mutable string variable in which a process of appending a character string is allowed, into an immutable string variable in which a process of appending a character string is not allowed; an immutable-to-mutable conversion instruction detection unit for detecting an immutable-to-mutable conversion instruction to convert the immutable string variable into the mutable string variable; and an instruction elimination unit for eliminating the immutable-to-mutable conversion instruction and for causing the mutable string variable as a source variable of the mutable-to-immutable conversion instruction, to be used as the mutable string variable obtained from conversion by the immutable-to-mutable conversion instruction after the immutable-to-mutable conversion instruction, if an instruction to be executed between the mutable-to-immutable conversion instruction and the immutable-to-mutable conversion instruction does not modify a character string stored in the mutable string variable as the source variable of the mutable-to-immutable conversion instruction and if an instruction to be executed between the immutable-to-mutable conversion instruction and use of the mutable string variable obtained from the conversion by the immutable-to-mutable conversion instruction does not modify any of the mutable string variable as the source variable of the mutable-to-immutable conversion instruction and the mutable string variable obtained from the conversion by the immutable-to-mutable conversion instruction.

Also included is a recording medium having any of the compiler programs recorded thereon.

As apparent from the above description, according to the present invention, a program which manipulates character strings can be optimized.

Although example embodiments of the present invention have been described in detail, it should be understood that various changes, substitutions and alternations can be made therein without departing from spirit and scope of the inventions as defined by the appended claims.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention. The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A compiler device for optimizing a program which manipulates a character string, the compiler device comprising:
   a processor including at least an append instruction detection unit for detecting an append instruction to append a character string to a string variable for storing a character string, in the program;
   the processor further including a store code generation unit for generating, as a substitute for each of a plurality of the append instructions detected by the append instruction detection unit, a store code for storing an address in memory where an appendant character string to be appended to the string variable by the append instruction is stored, into a buffer, the plurality of append instructions appending character strings to the same string variable; and
   the processor further including an append code generation unit for generating an append code for appending a plurality of the appendant character strings stored in a plurality of the addresses, to the string variable, at a position to be executed before an instruction to refer to the string variable in the program,
   wherein the append instruction detection unit detects, as the append instruction, a combination of:
   an instruction to convert an immutable string variable in which a process of appending a character string is not allowed, into a mutable string variable in which a process of appending a character string is allowed;
   an instruction to append the appendant character string to the mutable string variable; and an instruction to convert the mutable string variable into the immutable string variable,
   the processor further including an instruction elimination unit for eliminating an immutable-to-mutable conversion instruction and for causing the mutable string variable to be used as the mutable string variable after the immutable-to-mutable conversion instruction, if an instruction to be executed between a mutable-to-immutable conversion instruction and the immutable-to-mutable conversion instruction does not modify a character string stored in the mutable string variable, and if an instruction to be executed between the immutable-to-mutable conversion instruction and use of the mutable string variable does not modify any of the mutable string variable used as a source variable of the mutable-to-immutable conversion instruction and the mutable string variable.

2. A computer-implemented method for optimizing a program which manipulates a character string, the method comprising:
   detecting an append instruction to append a character string to a string variable for storing a character string, in the program; generating, as a substitute for each of a plurality of the append instructions detected by the append instruction detection unit, a store code for storing data of an appendant character string to be appended to the string variable by the append instruction into a buffer, the plurality of append instructions appending the character strings to the same string variable;
   generating an append code for appending a plurality of the appendant character strings to the string variable, at a position to be executed before an instruction to refer to the string variable in the program,
   wherein the append instruction detection unit detects, as the append instruction, a combination of:
   an instruction to convert an immutable string variable in which a process of appending a character string is not allowed, into a mutable string variable in which a process of appending a character string is allowed;
   an instruction to append the appendant character string to the mutable string variable; and an instruction to convert the mutable string variable into the immutable string variable; and
   eliminating an immutable-to-mutable conversion instruction and for causing the mutable string variable to be used as the mutable string variable after the immutable-to-mutable conversion instruction, if an instruction to be executed between a mutable-to-immutable conversion instruction and the immutable-to-mutable conversion instruction does not modify a character string stored in the mutable string variable, and if an instruction to be executed between the immutable-to-mutable conversion instruction and use of the mutable string variable does not modify any of the mutable string variable used as a source variable of the mutable-to-immutable conversion instruction and the mutable string variable.

3. The method according to claim 2, further comprising:
   detecting a reference instruction which first refers to the string variable after the character strings have been appended to the string variable by the plurality of append instructions, wherein the append code generation unit generates the append code at a position to be executed after the store codes and before the reference instruction.

4. A program storage device readable by machine, tangibly embodying a program of instructions executable by the machine to perform method steps for optimizing a program which manipulates a character string, said method steps comprising:
   detecting an append instruction to append a character string to a string variable for storing a character string, in the program; generating, as a substitute for each of a plurality of the append instructions detected by the append instruction detection unit, a store code for storing data of an appendant character string to be appended to the string variable by the append instruction into a buffer, the plurality of append instructions appending the character strings to the same string variable; and generating an append code for appending a plurality of the appendant character strings to the string variable, at a position to be executed before an instruction to refer to the string variable in the program, wherein the append instruction detection unit detects, as the append instruction, a combination of:

an instruction to convert an immutable string variable in which a process of appending a character string is not allowed, into a mutable string variable in which a process of appending a character string is allowed;

an instruction to append the appendant character string to the mutable string variable; and an instruction to convert the mutable string variable into the immutable string variable; and eliminating an immutable-to-mutable conversion instruction and for causing the mutable string variable to be used as the mutable string variable after the immutable-to-mutable conversion instruction, if an instruction to be executed between a mutable-to-immutable conversion instruction and the immutable-to-mutable conversion instruction does not modify a character string stored in the mutable string variable, and if an instruction to be executed between the immutable-to-mutable conversion instruction and use of the mutable string variable does not modify any of the mutable string variable used as a source variable of the mutable-to-immutable conversion instruction and the mutable string variable.

5. The program storage device of claim 4, further comprising:

detecting a reference instruction which first refers to the string variable after the character strings have been appended to the string variable by the plurality of append instructions, wherein the append code generation unit generates the append code at a position to be executed after the store codes and before the reference instruction.

* * * * *